United States Patent
Harris

(10) Patent No.: US 8,767,397 B2
(45) Date of Patent: Jul. 1, 2014

(54) COMPUTER SYSTEM WITH TRANSFERRABLE STYLE INFORMATION

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 28 days.

(21) Appl. No.: 13/176,012

(22) Filed: Jul. 5, 2011

(65) Prior Publication Data

US 2011/0267752 A1    Nov. 3, 2011

Related U.S. Application Data

(63) Continuation of application No. 12/122,683, filed on May 17, 2008, now Pat. No. 7,974,080.

(51) Int. Cl.
  *G06F 17/00* (2006.01)
  *G06F 17/30* (2006.01)

(52) U.S. Cl.
  CPC .................. *G06F 17/30905* (2013.01)
  USPC .............. 361/679.6; 361/679.02; 361/679.31; 715/235; 715/236

(58) Field of Classification Search
  USPC ............... 361/679.02, 679.21, 679.22, 679.6, 361/724–727, 752; 248/917–924; 715/235, 715/236, 764, 864, 762, 269, 275
  See application file for complete search history.

(56) References Cited

U.S. PATENT DOCUMENTS

| | | | |
|---|---|---|---|
| 6,023,714 A * | 2/2000 | Hill et al. ................... | 715/235 |
| 6,366,454 B1 | 4/2002 | Rapich et al. | |
| 6,769,991 B2 * | 8/2004 | Fields ............................ | 463/43 |
| 7,151,672 B2 | 12/2006 | Campbell | |
| 7,813,724 B2 * | 10/2010 | Gronner et al. ............ | 455/414.4 |
| 7,831,579 B2 * | 11/2010 | Wade et al. ................. | 707/705 |
| 2002/0126444 A1 | 9/2002 | Ozias et al. | |
| 2004/0184242 A1 | 9/2004 | Jones et al. | |
| 2006/0010374 A1 | 1/2006 | Corrington et al. | |
| 2007/0072581 A1 * | 3/2007 | Aerrabotu ................... | 455/404.1 |
| 2008/0089040 A1 | 4/2008 | Reed et al. | |
| 2009/0106671 A1 * | 4/2009 | Olson et al. .................. | 715/757 |
| 2009/0113319 A1 * | 4/2009 | Dawson et al. .............. | 715/762 |

OTHER PUBLICATIONS

Sony VaioVGX-TP1 computer picture, May 2008.

\* cited by examiner

*Primary Examiner* — Anthony Haughton
*Assistant Examiner* — Ingrid Wright
(74) *Attorney, Agent, or Firm* — Law Office of Scott C. Harris, Inc.

(57) ABSTRACT

A computer system that has an outer shape that is round in outer cross-section. The computer housing can be formed of first and second housing parts that are each round in outer cross-section where one unscrews relative to another like taking the lid off a jar. The inside of the housing can store various kinds of nonvolatile memory and a processor. The user's entire processing environment may be stored within the memory and processor, and part of that environment may include stylesheet that represents specific styles of the user.

19 Claims, 3 Drawing Sheets

COMPUTER SYSTEM WITH TRANSFERRABLE STYLE INFORMATION

CROSS-REFERENCE

This application is a continuation application of U.S. Ser. No. 12/122,683 filed May 17, 2008, which is now U.S. Pat. No. 7,974,080 issued Jul. 5, 2011.

BACKGROUND

Computing devices have packages that are conventionally rectangular in outer shape. These computing devices also have a conventional group of hardware devices, including a hard drive storing an operating system and driver files for the specific hardware of the computer, ports and removable media.

Similarly, some peripherals for a computer have historically been rectangular, such as keyboards, displays, and other such devices. Therefore, portable computers have conventionally been made in rectangular shapes also.

A computer conventionally has certain characteristics that are constant for the computer itself, not for the user that is using the computer. If the computer is sold or used by another user, it keeps the same characteristics.

SUMMARY

One aspect of the present application describes round housings for computer devices, and explains why round is the right shape for a computer case. The round cases described herein have at least one cross sectional area that is round; e.g., they can be disc shaped or spherical, or other.

Other aspects describe personalization within the computer devices.

DETAILED DESCRIPTION

The conventional shape for a computer case has been rectangular. There may be many reasons for this. Rectangular computer cases were first produced, since they were easy to open one side for example, and had lots of room.

The present inventor recognized that when you open the case of a rectangular computer, the inside is mostly air. There are expansion slots, cooling fans, but most of the space inside the case is actually wasted space.

The present inventor, however, realized that a rectangular shape is simply the wrong shape for a computer or computer component. The right shape for a computer housing is round in cross section—e.g., spherical or disk shaped. There are many reasons why, which are described herein.

Figure 1A:
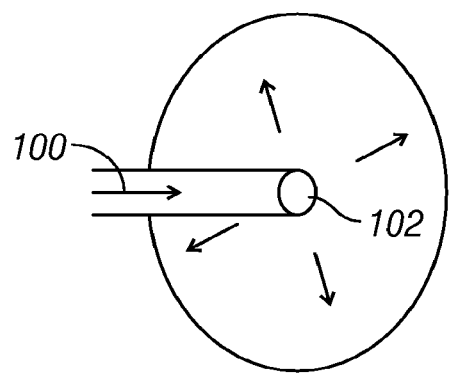
FIG. 1A illustrates the cooling of a computer part that has a circular outer cross-section.

Cooling of a computer is very important. It is important to maintain many of the different parts properly cooled. However, cooling extends radially outwardly from the cooled spot. That is, the inventor recognized that the cooled spot becomes a circle or sphere as shown in FIG. 1A where the cooling air 100 is delivered to a spot 102, and that spot extends spherically outward from that spot. When cooling the inside of a rectangular case, there are dead spots and overcooled spots.

Similarly, the devices most conventionally used for cooling are a fan. Fans use a rotating blade. The area of the fan blade as it rotates defines a substantially circular outer area. The outer edge of the fan therefore is round. Round is the right shape for cooling.

Rectangular devices can be stacked. Round and disk shaped devices can be stacked with one device stacked over the other.

Figure 1B:
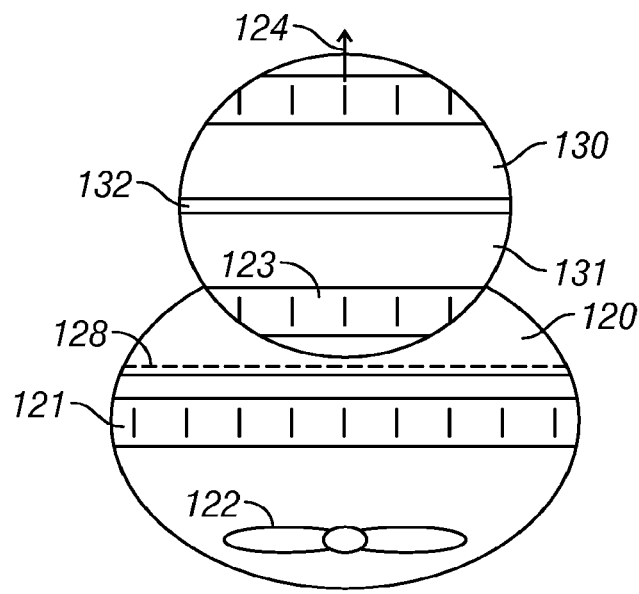
FIG. 1B illustrates a spherical computer and its cooling capability.

FIG. 1B shows a first sphere 120 with a cooling vent 121 around its periphery having air driven by a fan 122. An opening 123 may also receive air from the fan 122, which exhausts air via upper air vent 124.

Many of the computer parts are round, making round packages more practical. Rectangular packages waste a lot of the space. Integrated circuits are typically made in rectangular packages. However, the integrated circuit is typically much smaller than the package itself, so the package shape relative to the IC shape really does not matter so much.

Another advantage of spherical or disk shaped computer packages, or any shape which has an area which is round in cross-section, is that the housings can come apart very easily. In FIG. 1B, a top portion of the housing 130 and bottom portion of the housing 131 are separable from one another by unscrewing the whole housing part from the other. The top portion of the housing 130 has for example female screw threads at the area 132 which screw into corresponding male screw threads that are on the housing part 131. Similarly, the bottom housing part 120 includes a top and bottom housing connected together by screw threads 128. This allows unscrewing like the lid off a jar. A large opening can be obtained by simply unscrewing, without tools.

Figure 2:
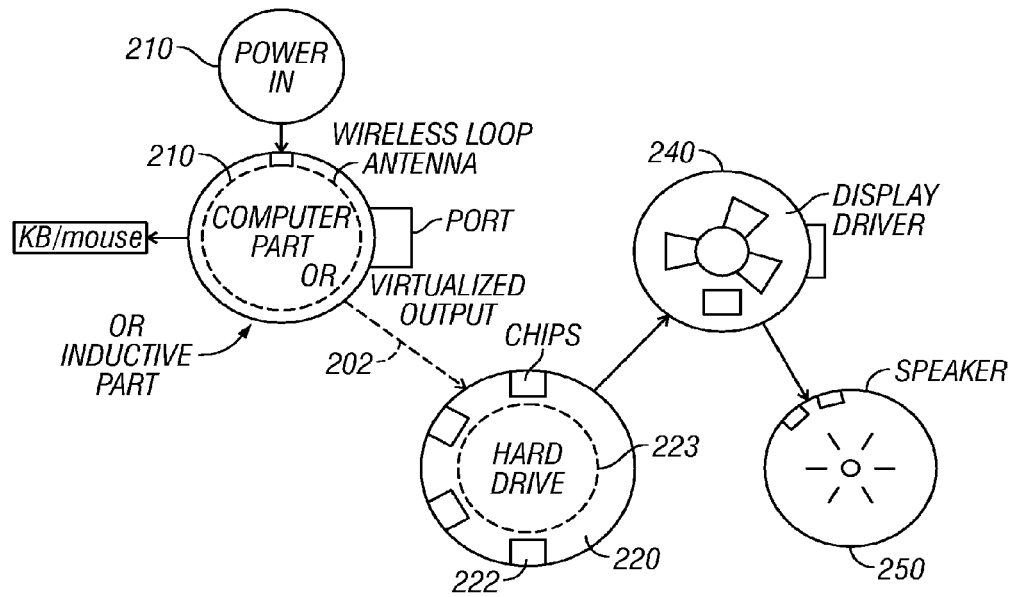
FIG. 2 illustrates how different parts of a computer can have housings with circular outer cross-section, which can all communicate.

An embodiment of a modular computer system is shown in FIG. 2. A first computer part 200 may be, for example, the electronics and processing structure of the computer. A number of different ports may be located on the outside of the computer. The power and board may be located as well as an output port, such as a USB port. The computer communication may also use a wireless output signal such as a Bluetooth signal that connects to a user interface shown as a keyboard or mouse.

Power may be wirelessly supplied, e.g., by an inductive or other wireless form of power can be used to power the computer part.

Another embodiment may use an external power supply 210 to produce the power to the computer. There may be reasons why that external power supply should have a housing whose outer shape has a cross section that is substantially circular. For example, power supplies often use spherical or disk shaped parts; such as toroidal transformers, for example. Hence, the power supplies can also be spherical or disk shaped.

The output from the computer part is output as a preferably wireless or wired signal as a virtualized output 202. The virtualized output may use for example VMWare or other similar virtualization programs. The virtualized output is sent to a hard drive portion 220 which includes the processing chips 222 around the outer edge thereof, and the hard drive platters 223 on the inner edge thereof. The hard drive platters 223 have a rounded outer circumference.

A display driver 240 is also shown, which has a rounded outer circumference. This may produce wireless high definition TV signal, e.g., HDMI or wireless DVI that is sent to a display. It alternatively may produce a wired output signal.

The chips used in display drivers conventionally need cooling, and are often cooled by a fan 241 which rotates, and forms an outer circumference that is round.

The speaker(s) may also be connected in an analogous way. The speaker cones may also be round, and they can be housed in a circular outer circumference housing.

All the housings in FIG. 2 may be of the type shown in FIG. 1B or may be disc shaped or of other shape.

In the embodiment shown in FIG. 2, the different parts may be separated from one another, and may communicate wirelessly via a short range communication technique; for example by Bluetooth or optically or by wireless Ethernet or using some other technique. The different parts may be required to be maintained within line of sight from one another in order to allow optical connections.

Figure 3:
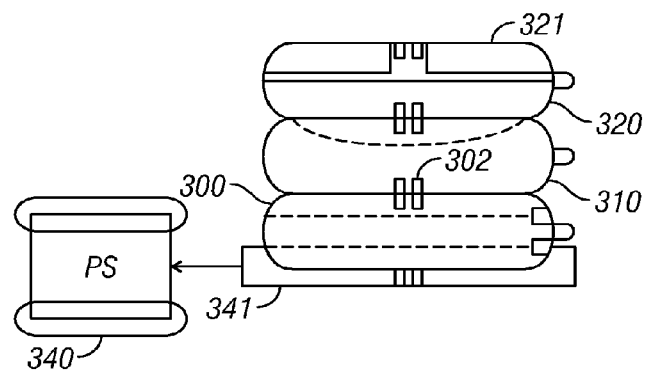
FIG. 3 shows how a number of disk shaped housings can be stacked forming a reconfigurable computer system from components.

FIG. 3 shows an alternative embodiment in which the different computer parts are physically stacked one over the other. The processing part 300 is shown stacked with the display driver part 310 which is shown stacked with a hard drive 320. The different parts each include internal contacts 302 which communicate power and also communicate the signal e.g. using ethernet or a fast IDE protocols such as serial ATA. Each communication is coupled to each other device. A power supply 340 may provide power to a cradle 341 on which the devices rest.

In this embodiment, the devices all have universal contacts so that any of the devices can be connected to the cradle, and the others can be connected in any order with the power and communication daisy chained between the different units.

Each of these may also be a housing type in which a top portion of the housing unscrews like a jar relative to the bottom portion of the housing. In this embodiment, however, the part that unscrews may be substantially doughnut shaped with a connector portion in the center that does not unscrew—thereby allowing the contacts to remain fixed.

Each edge of each device has cooling vents on the edge of the housing allowing cooling of the devices. An airflow through the devices; each in series with the other, passes cooled air through the combination of the components. Again, this allows in essence daisy chaining the cooling airflow through the housings. The housings collectively form a cylindrical air chamber.

One embodiment creates in essence a modular computer. The different computer parts are separable from one another and can communicate with one another. When one part fails, that part can be replaced with a spare. This also allows, however, certain parts of the computer to be transported between areas. In one embodiment, all communication from one part to another is virtualized, that is, it is sent in a virtual machine or Java like form and the communication is in essence independent of the hardware used to in the computer.

For example, in an embodiment using the hardware shown in FIG. 2, the computer, display driver, hard drive, are all modular, and all receive and send in virtualized form. The computer part and/or hard drive part can therefore be used with components from a different computer. The embodiments herein show other features which facilitate the modular operation and which allow one component to be moved to be used with another component.

Figure 4:
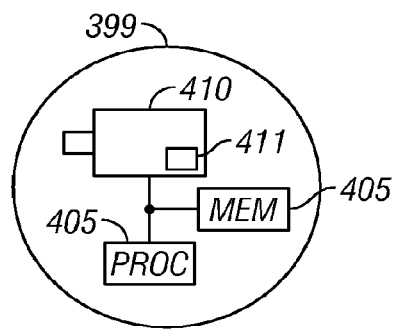
FIG. 4 illustrates an embodiment of a round outer cross-section computer with nonvolatile memory.

FIG. 4 shows a disk shaped computer embodiment, and shows how the computer inside includes a processor 400, memory 405 of conventional type, and also a nonvolatile memory 410 which may take the place in some embodiments of a hard drive. For example, the nonvolatile memory may be a USB connected memory package, e.g., of 32 GB or more, that can be installed or in other ways semipermanently affixed into the device.

As an alternative, the nonvolatile memory may simply include memory modules with some kind of connector, e.g., and edge connector, which are installed and removable, or may be permanently installed memory chips.

The nonvolatile memory 410 may store files allowing operation of not only the basic computer associated with the computer 399, but also files to allow the computer 399 to operate when connected to other hardware. The memory 410 may store files for the operating system, temporary files and user personalization files indicative of personal preferences of the user as described herein.

In one embodiment, the user may store their own personal "style information" within the nonvolatile memory 410. This style information defines aspects of the display and/or other representation information about the user/owner of the computer. This becomes a stylesheet that represents the look that is assigned to the information used by the user.

This "personal stylesheet" represents the way the computer displays not only default information, but also backgrounds, and other things. The stylesheet may set font of displayed information, color, borders, textures, backgrounds, sizes of pictures and/or fonts, location and specific media such as videos, sizes of windows that display the video, 3D, etc, as well as any other personalization that can be used for display, sound or any other output from the computer.

The style can be used for any display.

In another embodiment, the style information is used as part of an interactive game. Another embodiment uses the style information to display the representation of the user on a social networking site.

The style information is stored on the user's local computer, and sent from the user's local computer to the website over a remote channel such as the Internet. In this way, the user's personal information stays with a user, but is communicated to the Internet.

Figure 5:
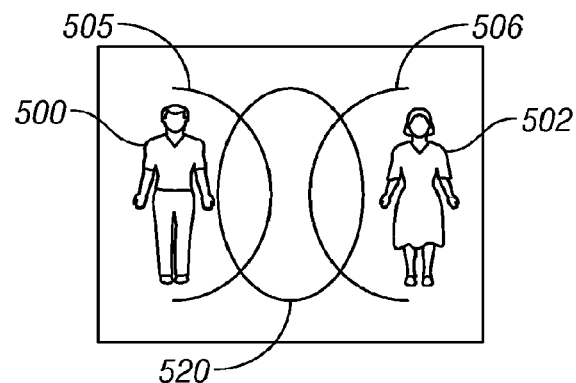
FIG. 5 shows how the files can be used to store individual stylesheets.

FIG. 5 illustrates a website or other comparable publicly or privately available accessible site, in which a number of different users can interact over a publicly available network. On the website of an embodiment, each user sees an image not only of themselves, but also of site-provided information, and also of other users who are either on the site, in the area of the one user, or otherwise associated with the site. This may be done in the context of a social networking site, or in an interactive game site in which users compete against other users.

In an embodiment, each user has an avatar 500 which may be a representation of themselves. This may be an avatar that the user has selected, or may be a personal picture, or any media representing the user. At least one other user may have their own avatar 502. Users viewing the site may view a scene shown in FIG. 5. This scene includes both the avatars 500 and 502. In the embodiment, the user 500 sees their avatar in an area whose characteristics are styled by a stylesheet that has characteristics set by the style files shown as 411 within the computer. The area around the user's avatar 500 is styled by the style sheet. This styling may include color, font, layout as well as media areas. For example, media clips may appear as background. The media clips may be lightened so that the foreground can be distinguished from the background. Also, the media clips can be videos or still pictures. Alternatively, the media can be played in a window near or at some distance from the user's avatar. The media can also be a combination of information selected by the user, e.g., content that the user updates and/or combinations of updated and non-updated content.

Moreover, this style file may be stored as files and may be moved between computers. The style file may include, but is not limited to, a background, a texture of the background, a color scheme, a stylization including fonts, colors or other items which are recognizable as being stylized according to the user parameters, any other aspect that can be displayed on the screen.

An area 505 around the user is stylized according to the style file. In essence, this becomes a stylesheet that is usable on the Internet and which represents a style that is selected by the user 500. The style may be set for example based on information set by the user on some website. A user may set certain characteristics on a homepage on a social networking website, and aspects of those characteristics may be used as the stylesheet.

FIG. 3 shows the housings having a similar outer diameter, but the embodiment of FIG. 1 shows housings with altering outer diameters. The cylindrical air chamber formed by the combination of housings may therefore have variable diameters along its length. In addition, airflow can be in any or all of said housings, for example each of said housings may include a miniature cooling fan.

The user 502 similarly has defined their own style 506. Note that 505 and 506 each define areas around the avatar representing each user. As the users approach one another, the areas 505 and 506 may overlap, causing an overlapped area 520. The overlapped area 520 may be styled according to any of some combination of the two styles, one of the styles which is more highly ranked than another style, or based on the user who has a higher rating for some reason, or system-defined style that is used for style overlaps. For example, the user who has been on the Internet or on the website for a longer period of time may cause the style from the user with the higher rating to override the style of the other user.

Different competitions may also be used to set ratings of the user, which may cause of their style to be more highly rated than other styles. The competitions may be games, or may be ratings given by other users.

The user's area that is styled by a stylesheet, allows other users may be able to recognize the users according to their style. The stylesheet becomes a way of recognizing a user outside of the avatar.

In an embodiment, the stylesheet may be used alone to represent the user, without an avatar. Alternatively, even if the user 500 uses a generic avatar, that generic avatar can still be recognizable based on the stylesheet.

The nonvolatile memory 410 may store all this information in a single casing, e.g., a sphere that may be used with other power supplies: devices and display devices. As an alternative, the computer device 399 may be a stand-alone computer including all the parts therein.

Figure 6:
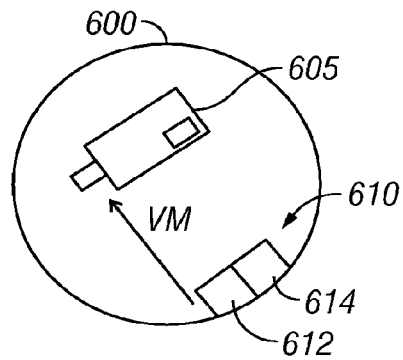
FIG. 6 shows another embodiment which stores.
Figure 7:
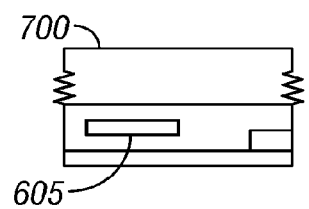
FIG. 7 shows how a computer with a round outer cross-section can have a lid that unscrews like a lid off the jar.

FIG. 6 illustrates yet another embodiment in which the computer 600 includes a nonvolatile memory 605. The nonvolatile memory 605 includes the whole operating system, temp files, and user files. The nonvolatile memory stores every file that is necessary for the user to re-create their entire environment. It may also store applications that are part of the user's operating system. An operating system as of the writing of this application, along with all applications, temp files, and everything else, typically takes no more than 20 GB of space which can easily fit on a 32 GB memory. This nonvolatile memory may be installed within the housing of the computer. In an embodiment, the housing since the computer has an outer periphery that is disk shaped, the housing unscrews like the lid off a jar. That is, the top portion of the housing may unscrew from the bottom portion of the housing. The top cover of the housing shown as 700 in FIG. 7 can be unscrewed from the bottom portion of the housing. Once the lid of the computer case has been removed, the nonvolatile memory 605 can be easily removed from the housing.

In addition to the nonvolatile removable memory, the computer system can also include permanently attached memory shown as 610. This permanently attached memory may be permanently electrically connected, soldered in or the like. The permanently attached memory can include two different parts: a read only memory part 611 as well as an updatable but permanently installed part shown as 614. The read-only memory stores information that is specific to the computer and integral to its operation. For example, the read-only memory may store a hardware ID and/or encryption or decryption key associated with that hardware ID. The hardware ID may be something that cannot be changed, and hence cannot only be read from the read-only memory, as desired. The read-only memory can also store native operating system and drivers for initialization. For example all the hardware within the read-only memory may have native drivers that are stored in 612. 612 may also store for example an emergency image, for use in response to crashes, the emergency image can be used.

The nonvolatile portion of the memory may store the BIOS, hardware specific files, updatable drivers, and others similar files. The permanently installed memory therefore allows certain files that are associated with the computer hardware itself to be used.

Each of these files in any of the embodiments, e.g., the embodiments of FIGS. 4 and 6 may be virtualized. For example the files within the nonvolatile memory 610 may use virtualized structure to communicate with any files that are stored within the removable memory 605. The virtualization enables any operating system for example to be run on any hardware. By vitalizing all of the outputs, any hardware information stored in 610 can be used with any operating system and any individual files used in 605.

Another advantage of this system is that instead of just storing personal files, the embodiment for example of FIGS. 4 and 6 may store personal files, stores certain software, and also include certain aspects of process. Since the inputs and outputs are accepted in virtualization format, this may produce a higher level of ability to transport one's computing environment to another location. A system may allow transporting the environment to another location of not only one's personal files, but also one's personal processor and processing environment.

Moreover, while many of these embodiments explain how round or disk shaped may be the proper housing shape, it should be understood that other housing shapes could be used.

Similarly, the virtualization can be used with the stylesheet of FIG. 5.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A computer system, comprising:
a first computer housing, which holds at least one computer component therein;
a second part which is separable from said first computer housing;
where said second part includes a nonvolatile memory that is read by said at least one computer component in said first computer housing, said nonvolatile memory storing personal style information within the nonvolatile memory defining aspects of a display that are personal to a user, and where said second part can be moved between computers, where the personal style information includes at least information about at least fonts and colors that are stylized according to user parameters, and where information indicative of the personal style information is used by an attached computer to which the second part is attached.

2. The system as in claim 1, wherein said personal style information represents a way the computer displays default information, including all of backgrounds, fonts of displayed information, color, borders, textures, and sizes of media.

3. The system as in claim 1, wherein said personal style information is sent by said attached computer to display a representation of the user on a website that is remote from the attached computer, in a way such that other users see the representation of the user that is stylized according to personal style information.

4. The system as in claim 1, wherein said personal style information is sent by said attached computer to a website and causes a user to view an avatar in an area on the website whose characteristics are styled by said style information.

5. The system as in claim 4, wherein areas outside said area that are seen on said website are not styled by said style information.

6. The system as in claim 5, wherein said areas outside said area on said website are seen as styled by other style information of other users.

7. The system as in claim 1, wherein said information indicative of the personal style information is sent to a remote website and used by the remote website to change a style of at least a part of the remote website.

8. A computer system, comprising:
a computer, having a processor and memory, and storing style information that sets a look of an area being viewed on the internet, and said computer outputting information indicative of said style information as part of a communication in which users are interacting with the Internet, where the style information stored in said memory is sent to a remote website and used by the remote website to change a style of the remote website as seen by at least one user, wherein said memory in said computer includes first and second nonvolatile memories in said computer, said first nonvolatile memory that is capable of being updated by a normal operation of an operating system, and said second nonvolatile memory not being capable of being updated by said normal operation of said operating system, wherein said second nonvolatile memory includes at least an emergency image which can be used to run said computer.

9. The computer system as in claim 8, wherein said information indicative of said style information is sent by said computer to display a representation of the user on a social networking website.

10. The computer system as in claim 8, wherein said information indicative of said style information causes multiple viewers of the remote website to view an avatar of a user who is using said computer in an area of said website whose characteristics are styled by style information in said information indicative of said style information.

11. The computer system as in claim 10, wherein areas outside said area of said website that are seen on said website are not styled by said style information.

12. The computer system as in claim 11, wherein said areas of said website outside said area are seen by users as styled by other style information of other users.

13. The computer system as in claim 8, wherein said memory in said computer includes a nonvolatile memory storing said style information within the nonvolatile memory, and wherein said nonvolatile memory does not include a processor therein, and where said nonvolatile memory can be moved between computers, where the style information includes at least information about at least fonts and colors that are stylized according to user parameters, and where information indicative of the style information is used by any attached computer to which the nonvolatile memory is attached.

14. A computer system, comprising:
a first computer part, having a processor and memory, said computer producing outputs and receiving inputs;
a second computer part, not having a processor, said second computer part being connectable to said first computer part, and capable of communicating with said first computer part,
wherein both said first computer part and said second computer part communicate to operate a computer operation,
and wherein said first computer part and said second computer part are in separate and connectable housings, said second computer part includes at least a first nonvolatile memory therein, said first nonvolatile memory including style information which stores and outputs individual information indicative of a style that has been selected by actions of a user, and where said second computer part can be moved between and connected to different computers, where the style information is stylized according to user parameters, and where information indicative of the style information is used by an attached computer to which the second part is attached.

15. A computer as in claim 14, further comprising a second nonvolatile memory, where said first nonvolatile memory that is capable of being updated by a normal operation of an operating system, and said second nonvolatile memory not being capable of being updated by said normal operation of said operating system, wherein said second nonvolatile memory includes at least an emergency image which can be used to run said computer.

16. A computer as in claim 14, wherein said information indicative of said style information is sent by said computer to display a representation of the user on a website that is remote from the attached computer, in a way such that other users see the representation of the user that is stylized according to the style information.

17. A computer as in claim 16, wherein said style information causes a user to view an avatar in an area of the website whose characteristics are styled by style information selected by said user.

18. A computer as in claim 17, wherein said areas outside said area of the website are seen by users as styled by other style information of other users.

19. A computer as in claim 14, wherein said style information is sent to a remote website and used by the remote website to change a style of the remote website that is seen by at least said user.

* * * * *